(12) United States Patent
Raynor et al.

(10) Patent No.: US 9,354,719 B2
(45) Date of Patent: May 31, 2016

(54) OPTICAL NAVIGATION DEVICES

(75) Inventors: Jeffrey Raynor, Lothian (GB); Pascal Mellot, Lans en Vercors (FR)

(73) Assignees: STMICROELECTRONICS (RESEARCH & DEVELOPMENT) LIMITED, Marlow Bucks (GB); STMICROELECTRONICS (GRENOBLE 2) SAS, Grenoble (FR)

(*) Notice: Subject to any disclaimer, the term of this patent is extended or adjusted under 35 U.S.C. 154(b) by 125 days.

(21) Appl. No.: 14/001,731

(22) PCT Filed: Feb. 3, 2012

(86) PCT No.: PCT/GB2012/050236
§ 371 (c)(1),
(2), (4) Date: Oct. 14, 2013

(87) PCT Pub. No.: WO2012/117232
PCT Pub. Date: Sep. 7, 2012

(65) Prior Publication Data
US 2014/0028556 A1    Jan. 30, 2014

(30) Foreign Application Priority Data
Feb. 28, 2011   (GB) .................................. 1103346.1

(51) Int. Cl.
G06F 3/041    (2006.01)
G06F 3/033    (2013.01)
G06F 3/03     (2006.01)
G06F 3/0354   (2013.01)
G06F 3/038    (2013.01)

(52) U.S. Cl.
CPC .............. *G06F 3/033* (2013.01); *G06F 3/0304* (2013.01); *G06F 3/038* (2013.01); *G06F 3/03547* (2013.01); *G06F 2203/04101* (2013.01)

(58) Field of Classification Search
CPC ... G06F 3/0304; G06F 3/033; G06F 3/03547; G06F 3/038
USPC .......................... 345/158, 166, 173, 175, 863
See application file for complete search history.

(56) References Cited

U.S. PATENT DOCUMENTS 6,750,848 B1   6/2004   Pryor
7,634,111 B2   12/2009  Kondo et al.
(Continued)

FOREIGN PATENT DOCUMENTS

CN   101021867   8/2007
EP   1594040 A2  11/2005
(Continued)

*Primary Examiner* — Kent Chang
*Assistant Examiner* — Nelson Rosario
(74) *Attorney, Agent, or Firm* — Allen, Dyer, Doppelt, Milbrath & Gilchrist, P.A.

(57) ABSTRACT

An optical navigation device is provided for detecting movement of a pointer, such as a finger, in three dimensions. A sensor obtains images of the pointer which have been illuminated by an illumination source, and an image scaling module determines the difference in size between images acquired by the image sensor to determine the difference in height of the pointer between images.

17 Claims, 9 Drawing Sheets

(56) References Cited

U.S. PATENT DOCUMENTS

| | | |
|---|---|---|
| 7,831,065 B2 | 11/2010 | Zimmermann et al. |
| 2004/0189720 A1* | 9/2004 | Wilson et al. ............ 345/863 |
| 2008/0043848 A1 | 2/2008 | Kuhn |
| 2010/0020157 A1* | 1/2010 | Jelinek ............ G06K 9/00026 348/36 |
| 2010/0053119 A1* | 3/2010 | Hayasaka et al. ............ 345/175 |
| 2010/0053151 A1 | 3/2010 | Marti et al. |
| 2010/0328265 A1 | 12/2010 | Hotelling et al. |
| 2013/0088461 A1* | 4/2013 | Shamaie ............ 345/175 |
| 2013/0307676 A1* | 11/2013 | Raynor ............ G08C 17/02 340/12.22 |

FOREIGN PATENT DOCUMENTS

| | | |
|---|---|---|
| GB | 2345538 A | 7/2000 |
| GB | 2474536 A | 4/2011 |
| WO | 0007147 | 2/2000 |
| WO | 2005091125 A2 | 9/2005 |
| WO | 2010098050 A1 | 9/2010 |
| WO | 2011069148 A1 | 6/2011 |

* cited by examiner

| SAD run | X Shift | Y Shift | Zoom |
|---|---|---|---|
| 1 | X0-DX1 | Y0-DY1 | Z0-DZ1 |
| 2 | X0 | Y0-DY1 | Z0-DZ1 |
| 3 | X0+DX1 | Y0-DY1 | Z0-DZ1 |
| 4 | X0-DX1 | Y0 | Z0-DZ1 |
| 5 | X0 | Y0 | Z0-DZ1 |
| 6 | X0+DX1 | Y0 | Z0-DZ1 |
| 7 | X0-DX1 | Y0+DY1 | Z0-DZ1 |
| 8 | X0 | Y0+DY1 | Z0-DZ1 |
| 9 | X0+DX1 | Y0+DY1 | Z0-DZ1 |
| 10 | X0-DX1 | Y0-DY1 | Z0 |
| 11 | X0 | Y0-DY1 | Z0 |
| 12 | X0+DX1 | Y0-DY1 | Z0 |
| 13 | X0-DX1 | Y0 | Z0 |
| 14 | X0 | Y0 | Z0 |
| 15 | X0+DX1 | Y0 | Z0 |
| 16 | X0-DX1 | Y0+DY1 | Z0 |
| 17 | X0 | Y0+DY1 | Z0 |
| 18 | X0+DX1 | Y0+DY1 | Z0 |
| 19 | X0-DX1 | Y0-DY1 | Z0+DZ1 |
| 20 | X0 | Y0-DY1 | Z0+DZ1 |
| 21 | X0+DX1 | Y0-DY1 | Z0+DZ1 |
| 22 | X0-DX1 | Y0 | Z0+DZ1 |
| 23 | X0 | Y0 | Z0+DZ1 |
| 24 | X0+DX1 | Y0 | Z0+DZ1 |
| 25 | X0-DX1 | Y0+DY1 | Z0+DZ1 |
| 26 | X0 | Y0+DY1 | Z0+DZ1 |
| 27 | X0+DX1 | Y0+DY1 | Z0+DZ1 |

*Fig. 8*

OPTICAL NAVIGATION DEVICES

FIELD OF THE INVENTION

The present disclosure relates to optical navigation devices such as, for example, optical mice being operated in three-dimensions (3D).

BACKGROUND OF THE INVENTION

Computing devices are becoming ever smaller and full computing functionality can be found on phones and smart phones and other personal digital assistants (PDAs). As the computing devices become smaller, the various features of the computing devices may also become smaller. This includes a smaller input device for the user to enter input data into the computing device. One such input device is an optical navigation device. Many computing devices, large and small, are equipped with optical navigation devices, such as a mouse.

Finger mice are becoming more common on mobile phones, laptops, digital still cameras (DSC) and many other devices. In addition, 3D displays are becoming more popular. Current input or navigation devices (e.g. touch screens, mice, and finger mice including Optical Finger Navigation (OFN), Optical Navigation Mouse (ONM), Optical Joystick (OJ)) are typically two-dimensional (2D). Operating systems supporting 3D windows and operations requiring 3D control inputs are currently being developed. Even with a 2D display, a 3D navigation device is useful to recognize a wider range of gestures.

Most finger mice are modifications of a standard personal computer (PC) mouse, where a user moves their finger on top of a surface in X and Y directions. A sensor images the finger and uses the images to create X and Y motion vectors corresponding to the movement of the user's finger. These sensors are unable to detect movement in the Z axis. A common method to obtain depth information is to use two sensors which are spatially separated.

FIG. 1a shows an example of a finger mouse system with two image sensors. As can be seen in FIG. 1a, if the finger is moved vertically (i.e. along the Z axis) a feature on the sensors moves in the image plane. The same feature moves in opposite directions on the two sensors, permitting X and Y movement to be differentiated from Z movement. There may be some drawbacks to this approach, including: two sensors are required, which adds to the cost and space requirements of the device; at least two apertures are needed in the device, which may be considered to be unattractive; the images from the sensors are compared with one another, which may require additional processing; a high data rate may need to be supported by both the output transmitters of the sensors and also the receiver of the image processing unit; and accurately matching the two images, especially with a periodic structure such as a lateral shift, as found on a fingerprint, may be difficult and can produce incorrect triangulation or Z-height information.

Another approach to determining the distance is to measure the time it takes light to travel from the emitter, such as a light emitting diode (LED) or Vertical Cavity Surface Emitting Laser (VCSEL) to the object and then back to the sensor. A Single Photon Avalanche Detector (SPAD) is suitable for measuring this as it has a high electric field in the detector, which allows a photo-generated electron to be accelerated and quickly detected. In addition, the gain of the avalanche means that a digital pulse is produced and can be counted. However, a single SPAD may have no spatial resolution, and so a single detector may not determine if the object (i.e. finger) is moving, for example, along a circle with the SPAD at the center in the form of a common gesture. An approach to this drawback may comprise employing multiple SPAD devices, although the requirement for more apertures in the device housing may be unappealing. A possible system would employ 2 SPADs and 1 mouse sensor to extract motion in X, Y, and Z axes and may require 3 apertures.

SUMMARY OF THE INVENTION

It is an object of the present disclosure to provide an approach to at least some of the drawbacks associated with the prior art.

It is a further object of the present disclosure to provide an optical navigation device which operates in 3D.

According to one aspect of the present disclosure, an optical navigation device is for detecting movement of a pointer, such as a finger, in three dimensions, i.e. 3D. Optionally, the optical navigation device may further comprise a sensor adapted to obtain images of the pointer which have been illuminated by an illumination source.

Optionally, the optical navigation device may further comprise an image shift module for determining the difference between a first and a second image to thereby determine a motion vector between the first and second images. The optical navigation device may further comprise an image scaling module for determining the difference in size between the first and second images to determine the difference in height of the pointer from the first image to the second image.

Optionally, the difference may be determined by a sum of absolute difference (SAD) process in which image properties are varied to allow the first and second images to be compared with one another. The optical navigation device may further comprise a correlation module for determining a minimum SAD value from the SAD process. The minimum SAD value may indicate that the first and second images are a best match, thereafter deriving the image properties associated with the minimum SAD value.

Optionally, at least one of the image properties associated with the minimum SAD value represents the most likely motion vector between the first and second image. Additionally, at least one of the image properties associated with the minimum SAD value represents the most likely difference in height of the pointer between the first and second image.

Optionally, the optical navigation device may further comprise a gain module for determining and compensating for system performance variations. Furthermore, the system performance variations may include brightness. For example, the optical navigation device may comprise a mouse, such as a finger mouse.

The present disclosure may offer a number of benefits. The present disclosure may provide an optical sensor that is able to determine motion in three dimensions, but with only a single aperture. In addition, the present disclosure may provide an efficient method and device for providing mouse functions in 3D, which can easily measure movements in x, y, and z directions to thereby determine control functions. Other factors, such as ambient light conditions and the distance of the object being imaged from the sensor, are also taken into account, and compensation is applied as appropriate.

BRIEF DESCRIPTION OF THE DRAWINGS

Reference will now be made, by way of example, to the accompanying drawings, in which:

FIG. 8 is a table showing a sum of absolute differences, in accordance with an embodiment of the present disclosure.

DETAILED DESCRIPTION OF THE PREFERRED EMBODIMENTS

The present disclosure relates to an optical navigation device, such as a mouse of small-scale, which is intended to be operated by means of standard imaging, where light is reflected from a finger to recognize the movement of a finger on an imaging surface. This type of mouse is herein referred to as a finger mouse.

Figure 1A:
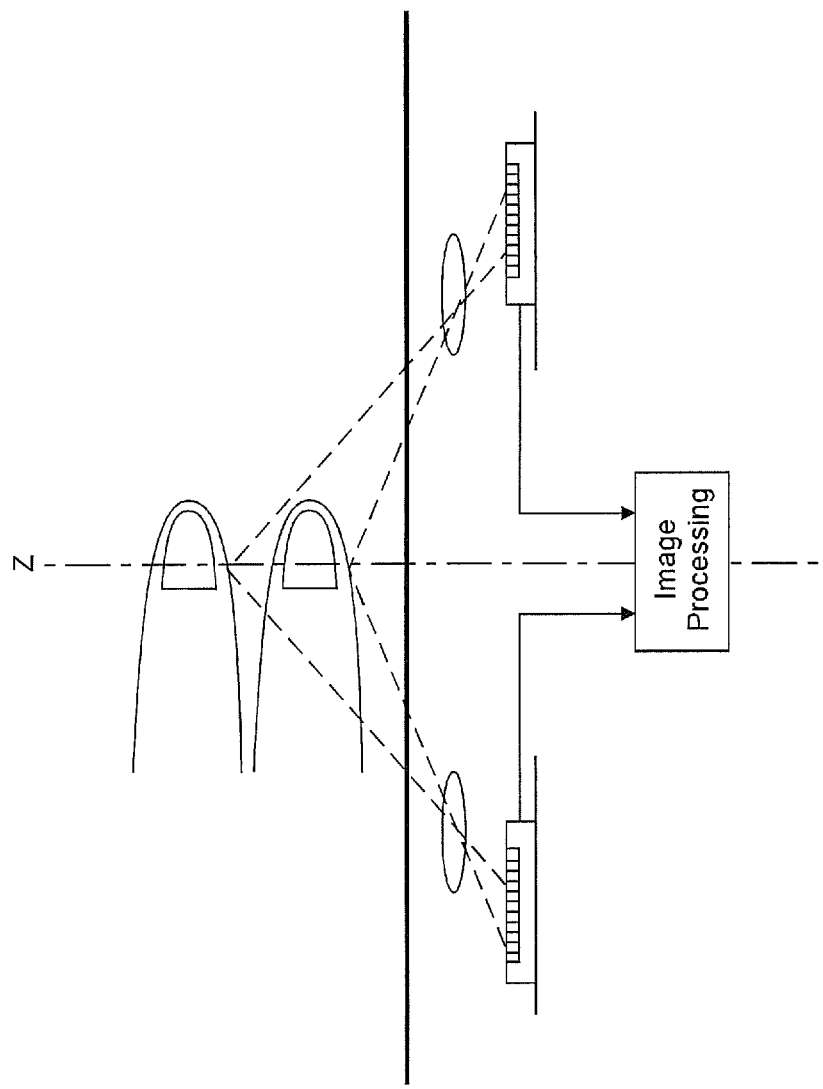
FIG. 1a is block diagram of a stereoscopic finger mouse, according to the prior art.
Figure 1B:
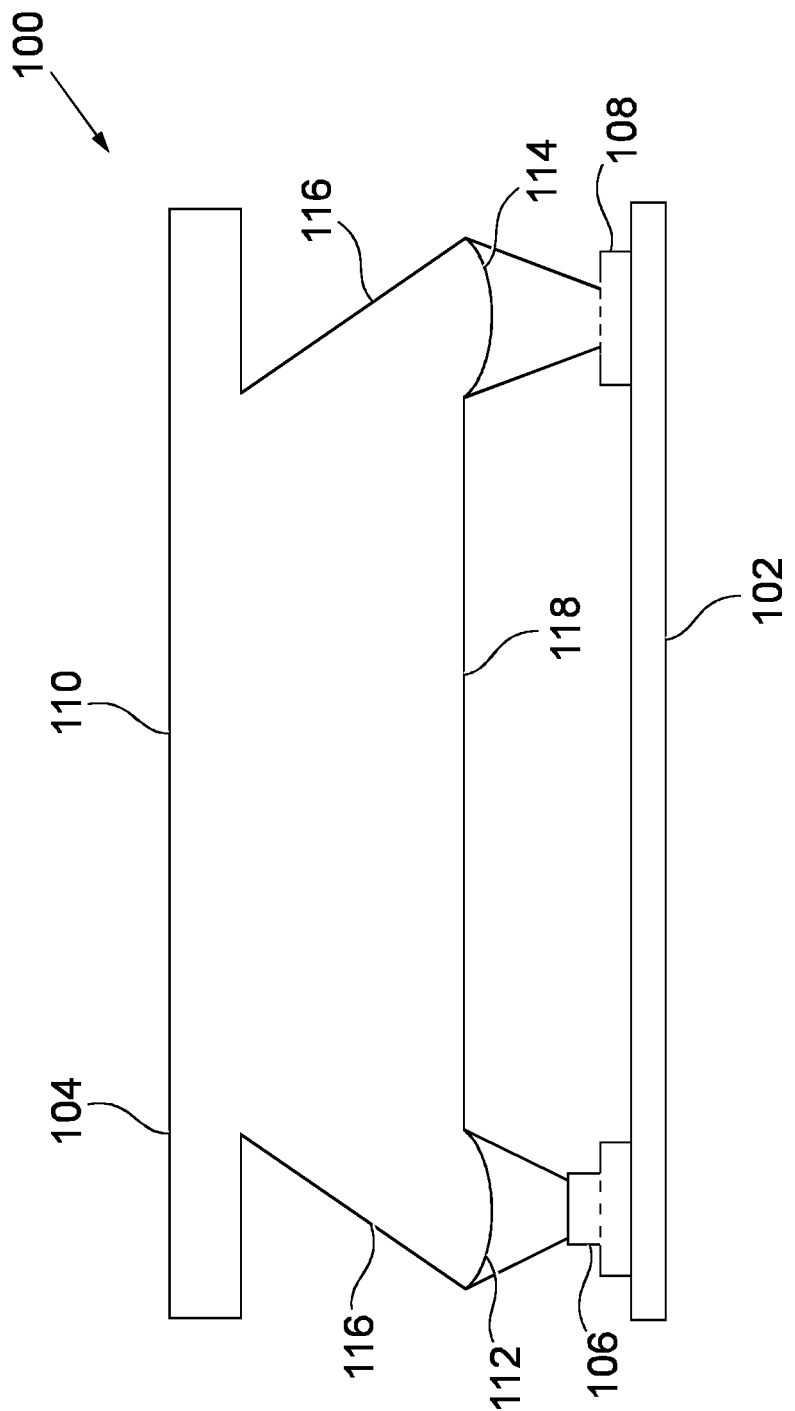
FIG. 1b is a block diagram of a finger mouse, in accordance with an embodiment of the present disclosure.

FIG. 1b shows an example of a finger mouse 100. The finger mouse includes a base 102, an imaging element shown generally at 104, an LED 106, and a sensor 108. The top surface 110 of the imaging element 104 is a window through which illumination can pass. In addition, the imaging element includes a collimating lens 112 between the LED and the imaging element, and an imaging lens 114 between the imaging element and the sensor. The imaging element further includes two total internal reflection mirror elements 116 which direct illumination from the collimating lens to the target, for example, the pointer, and then from the target back to the imaging lens. The lower surface 118 of the imaging element is substantially flat. This is just one example of an optical mouse and many variations may be implemented without diverging from the basic principles of operation thereof.

In use, a user may move a pointer over the window 110, which may also referred to as the mousing surface. The pointer may be simply the user's finger, which passes over the surface. The finger includes fingerprint ridges, which can be detected to identify the movement being made.

The distance between the window 110 and the first LED or sensor in the present embodiment is in the region of 2.5 mm. This distance is the thickness of the navigation device and can vary between 1 mm and 3 mm. Ideally the thickness is not generally greater than 5 mm. The navigation device can be formed from a single molding piece. The molding includes each of the individual optical elements shown in the diagrams. The navigation device could alternatively be made in other appropriate ways with different optical elements, which produce the same optical effect. The navigation device may also be made from a number of different elements, rather than a single molding piece. The technique for forming the navigation device may include techniques other than molding, such as replication, stamping, embossing, or machining.

The illumination sources are, for example, LEDs which may be of any appropriate type and may generate a source in the "optical" or non-optical ranges. Accordingly, reference to optics and optical are intended to cover wavelengths that are not in the human visible range. The optics that takes the illumination from the source to the imaging surface may be of any appropriate type.

The sensor may be a CMOS sensor having an array of pixels for measuring reflected light at different locations to produce an image. The array is generally formed from a number of pixels forming a grid like array with pixels extending in rows and columns. The present disclosure may equally make use of different types of sensors. There may be various types of pixels-readout methods, for example, a rolling blade or global shutter mechanism, a system of passive pixels or active (3Transistor, 4Transistor) pixels, a readout with correlated double sampling, or merely double sampling.

Figure 2:
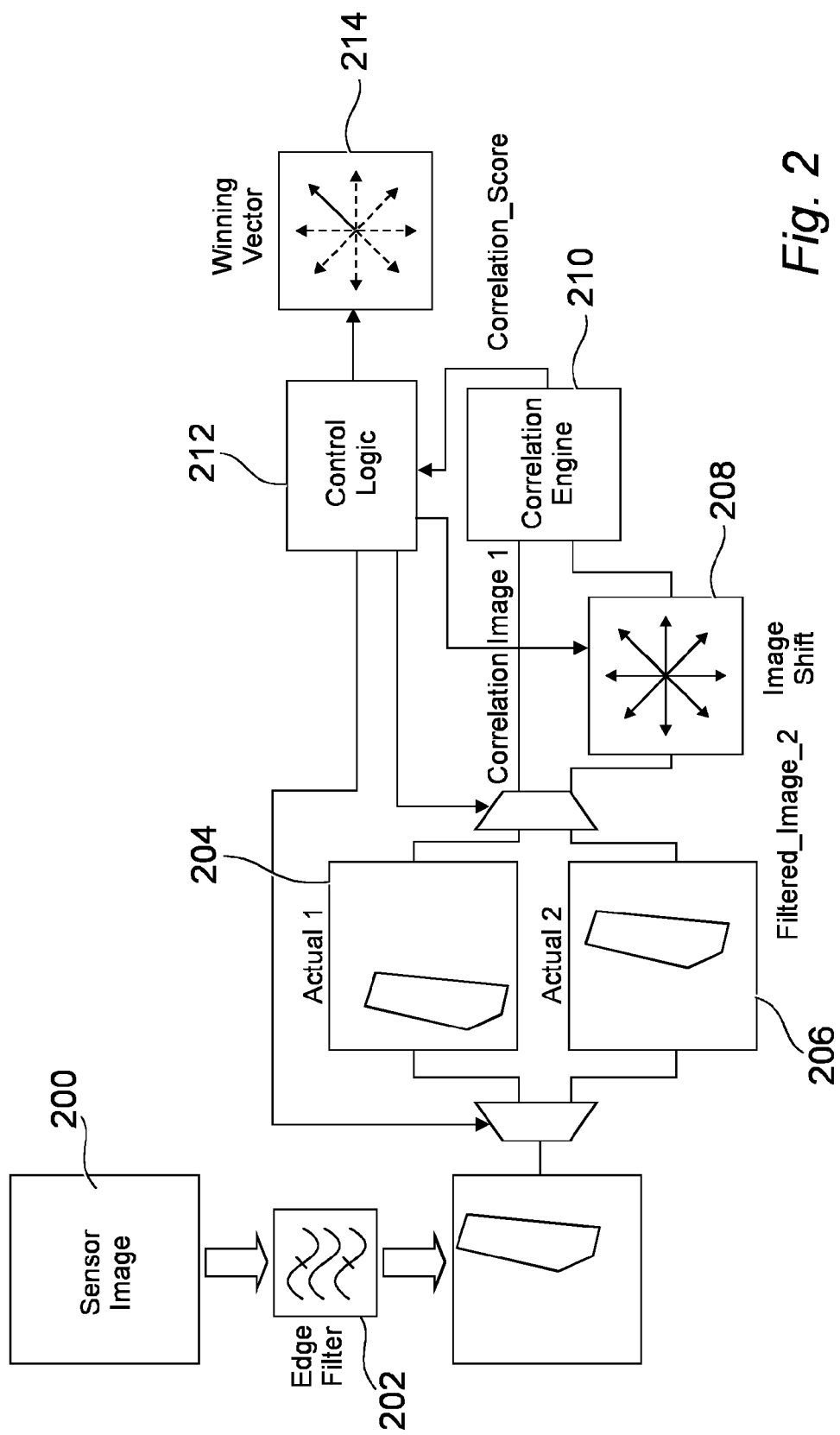
FIG. 2 is a block diagram of a finger mouse navigation engine, in accordance with an embodiment of the present disclosure.

The operation of a 2D mouse will now be described with reference to FIG. 2. FIG. 2 shows an overview of a signal path from a sensor image 200. The sensor includes a pixel array (not shown) which is preferably able to take two images per frame. The first is taken with the LED or illumination source off to create a "Black" image and the second with the illumination source on to create an "Exposed" Image. The first image is then subtracted from the second to remove any fixed pattern noise and to perform a reset, also referred to as "kTC" noise. It is possible to compare the images directly, however to ensure even illumination across the image plane, a filter, such as an "Edge Filter" 202, is applied. This can remove low spatial frequency variations and enhance high spatial frequency variations. With such a filter, any slow or spatial variations of illumination are removed, and so the system is more tolerant to uneven illumination across the image plane. Two edge-filtered images 204 and 206 are compared. One image 204 has been recently acquired, and the other 206 has been acquired previously. The signal path also includes an image shift 208 and a correlation engine 210, both of which are controlled by control logic 212. The function of these elements will be described below.

There are many different ways to compare the image. One way is to use a previously determined motion vector (Xshift, Yshift) as a first estimate of the motion between the two images. One image is shifted by the image shift using this motion vector, and the shifted image is compared to the other non-shifted image. The comparison typically makes use of the sum of absolute differences (SAD) where the absolute difference between corresponding pixels is added together. This can be expressed as follows:

```
Correlation_Image_2 = ImageShift(Filtered_Image_2,Xshift,Yshift)
SAD=0
For Y= 0 to YMAX
For X= 0 to XMAX
    SAD = SAD + ABS (Correlation_Image_1(X,Y)
    Correlation_Image_2(X,Y) )
Next X
Next Y
```

Figure 3:
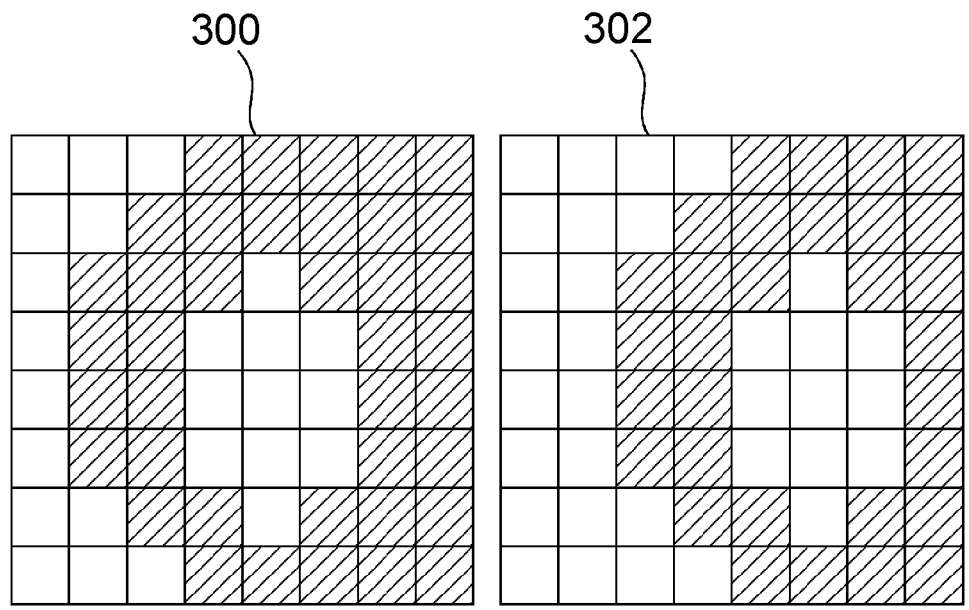
FIG. 3 is a schematic diagram of an image of finger motion, in accordance with an embodiment of the present disclosure.
Figure 4:
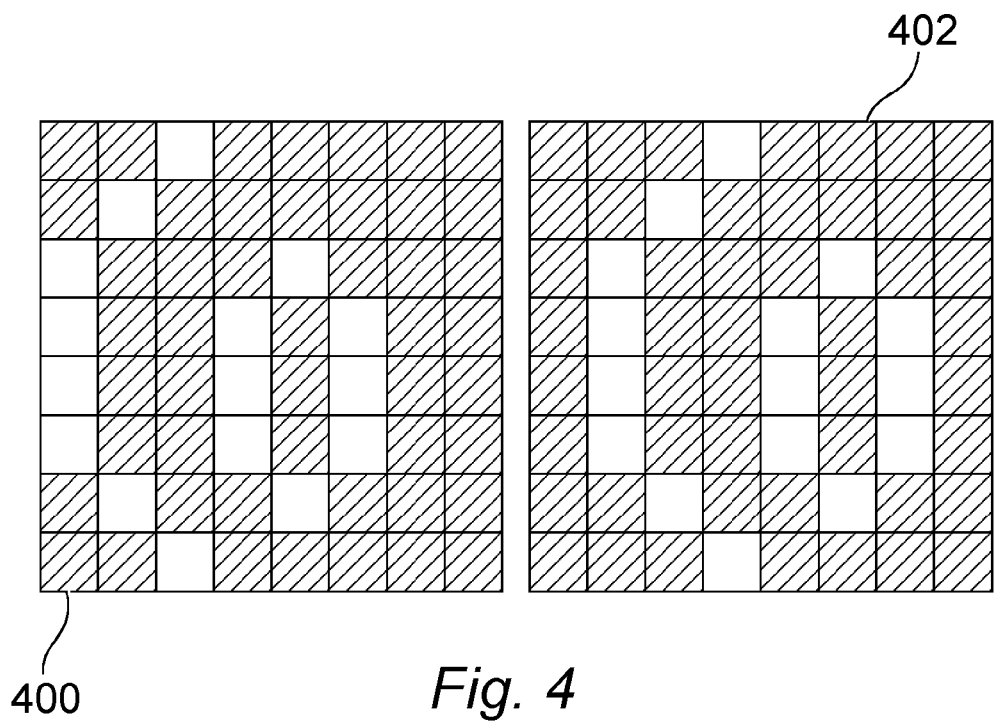
FIG. 4 is a schematic diagram of a filtered image of finger motion, in accordance with an embodiment of the present disclosure.
Figure 5:
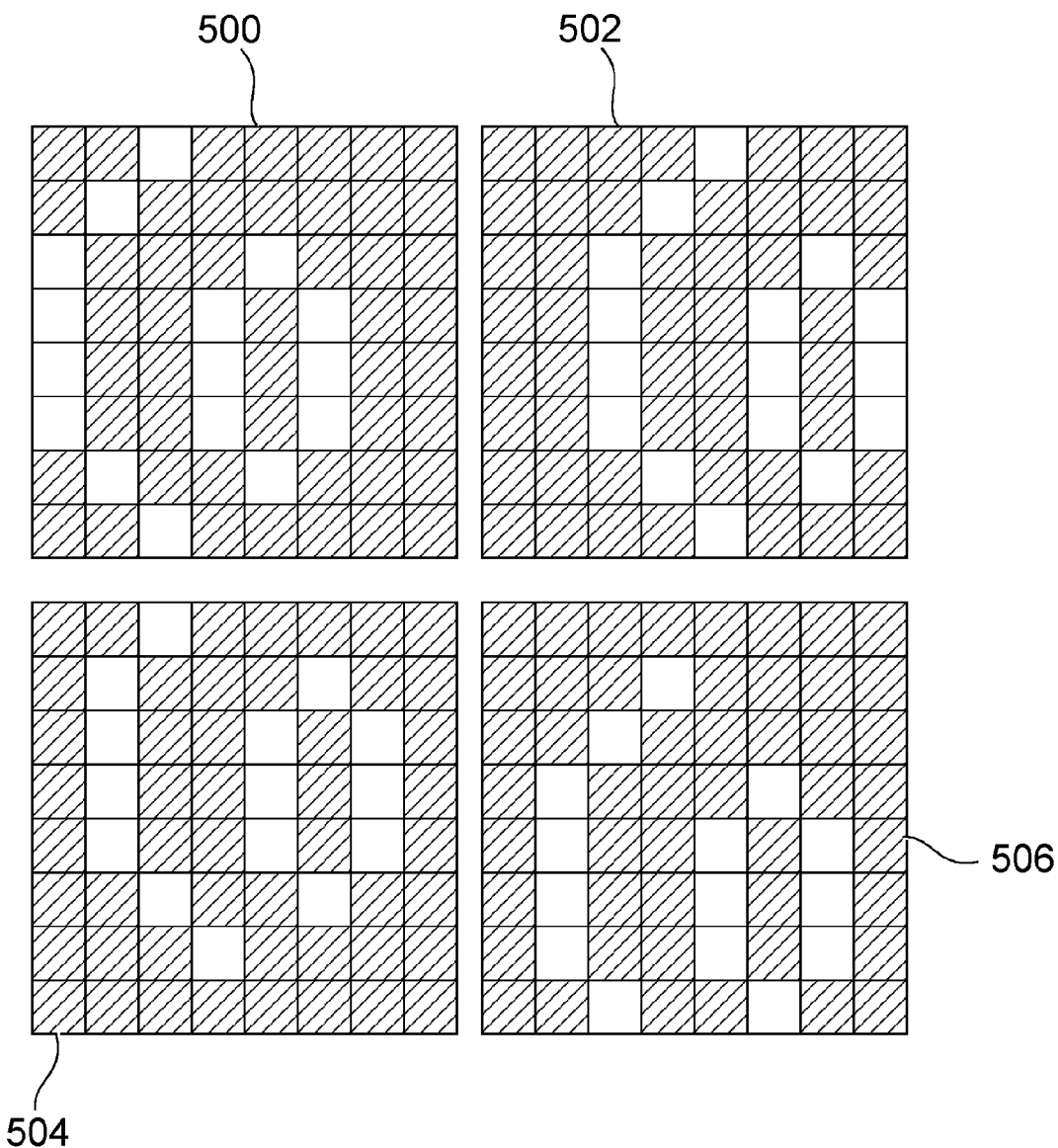
FIG. 5 is a schematic diagram of a filtered image of finger motion with shift incorporated, in accordance with an embodiment of the present disclosure.

The resulting SAD is stored and both the Xshift and Yshift are varied and another SAD is computed. When the calculated value of SAD is at a minimum as determined by the correlation engine, the two images (Correlation_Image_1 & Correlation_Image_2) are most similar and the shift applied to the Correlation_Image_2 is then the correct motion vector between the two images. This then becomes the "winning vector" 214. FIG. 3 shows two images: frame N 300 and frame N+1 302. For the purposes of clarity, the contrast is enhanced to get black (0% signal) or peak white (100% signal). Furthermore, the image shifts are shown as integral pixels, although in practice, the image may be shifted by a fraction of a pixel using interpolation of the image. The two images can be filtered as described above with reference to FIG. 2 to give rise to edge filtered images 400 and 402 as shown in FIG. 4. Examining the two filtered images 400 and 402, the two images are similar, but there is a shift. This shift can be determined by shifting "Filtered Image—Frame N+1" in various directions as is shown in FIG. 5. The four images in FIG. 5 are Filtered Image Frame N+1 with a shift left (500), a shift right (502), a shift up (504), and a shift down (506), respectively. Comparison with each of these shifted images is made with the filtered image of Frame N in FIG. 4 (400). The closest match in FIG. 5 is "Filtered Image—Frame N+1—Shift Left" (500). Thus, the movement vector between Frame N (300) and Frame N+1 (302) in FIG. 3 is one pixel to the left.

Figure 6:
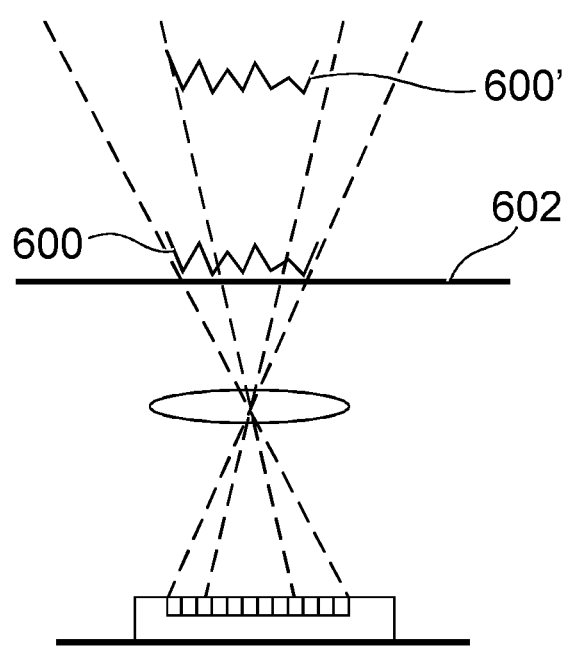
FIG. 6 is a schematic diagram of an optical path for a 3D finger mouse, in accordance with an embodiment of the present disclosure.

As has been seen, the operation of a 2D optical mouse shifts images around and performs correlations to determine movement vectors. FIG. 6 shows the optical path for a 3D movement, with a finger 600 placed on top of the mousing surface 602 (typically the surface of the housing) and also with a finger 600' above the mousing surface. From geometric optics, when the finger is further from the sensor, the ridges and valleys on the fingerprint get smaller on the image plane. This principle can be used in the present disclosure to monitor the motion of the finger in the Z axis.

Figure 7:
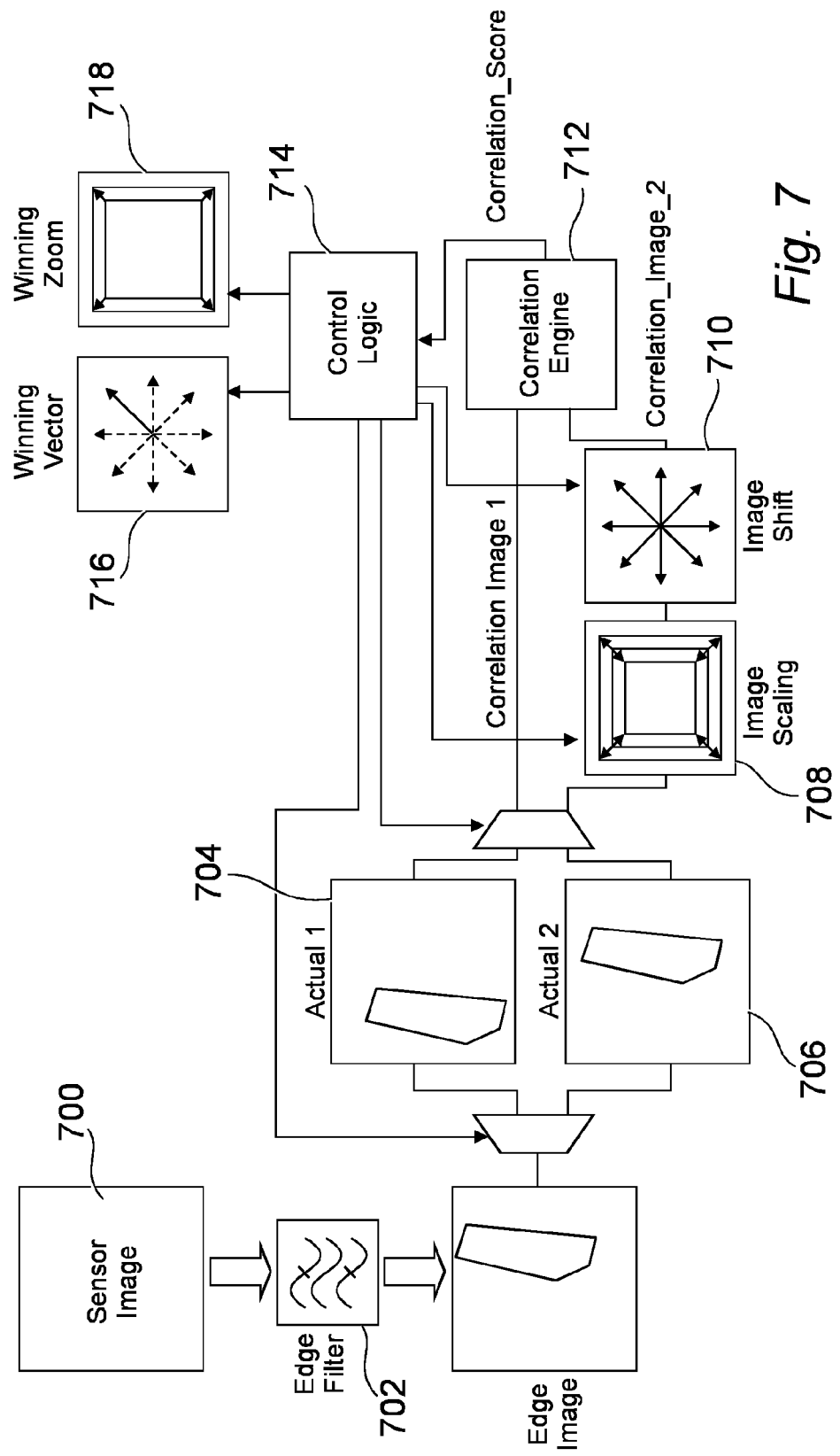
FIG. 7 is a block diagram of a 3D finger mouse navigation engine, in accordance with an embodiment of the present disclosure.

In contrast to typical optical navigation engines, which operate on size invariant images, the present disclosure includes a process for scaling the images, such as zooming in or zooming out, before they are correlated. The optical path for the process of the present disclosure is shown in FIG. 7. The optical path is similar to that of FIG. 2. The sensor image 700 undergoes an edge filtering process 702 in which a first and second edge filtered image 704 and 706 are produced. The first filtered image 704, being the latest filtered image and the second 706, being a previous filtered image. The filtered images then undergo an image scaling process 708 and an image shift process 710, the results from which pass through the correlation engine 712. The control logic 714 then determines the "winning vector" 716 which relates to X, Y movement and the "winning zoom" 718 which relates to movement in the Z direction.

The technique employed will now be described in further detail. To determine motion in 3D, an expanded version of the 2D technique is used. A first image is shifted and scaled and then compared to a second. As previously described, the comparison may use SAD, where the absolute difference between corresponding pixels is summed. This occurs as follows:

```
Function SAD(Correllation_Image_1, Correlation_Image_2,
XShift,YShift,ZScaleFactor)
   Correlation_Image_2 = ImageShift(ImageScaling
   (Filtered_Image_2,ZScaleFactor), XShift,YShift)
   SAD=0
   For Y= 0 to YMAX
   For X= 0 to XMAX
      SAD = SAD + ABS (Correlation_Image_1(X,Y) −
      Correlation_Image_2(X,Y) )
   Next X
   Next Y
```

The resulting SAD is stored and the ZScalefactor, Xshift, and Yshift are varied and another SAD is computed. Once the SAD is at a minimum, the two images (Correlation_Image_1 & Correlation_Image_2) are most similar, and the shift applied to the Correlation_Image_2 is then representative of the motion vector and the Z scale factor between the two images. A simple algorithm to implement this is shown below:

```
index=0
For ZScaleFactor = Zoom_Min to Zoom_Max step Zoom_Delta
   For XShift = −XShiftMax to +XShiftMax step XShiftDelta
      For YShift = −YShiftMax to +YShiftMax step YShiftDelta
         SADscore(index) = SAD(Correlation_Image_1,
   Correlation_Image_2, XShift,YShift,ZScaleFactor)
         XShiftArray(index) = XShift
         YShiftArray(index) = YShift
         ZScaleArray(index) = ZScaleFactor
         index = index+1
      Next YShift
   Next XShift
Next ZScaleFactor
```

This routine allows all the possible scaling and X and Y shifts to be checked and a resulting SADscore to be determined and stored in an array SADscore. The SADscore is calculated by the function SAD. The scores are then checked to determine the lowest, which equates to the best match. The checking of the scores may be carried out as follows:

```
NumImages=index−1 #
LowestSAD = SADscore(0)
BestSAD = 0
For I = 1 to NumImages
   If SADscore(I) < LowestSAD THEN LowestSAD=SADscore(I) ;
   BestSAD=I
Next I
```

Having identified the best match (BestSAD), the zoom and shift operations that contain the best match between the reference image and the acquired image are also identified. Hence, XShiftArray(BestSAD), YShiftArray(BestSAD), and ZScaleArray(BestSAD) contain the X, Y, Z movement vectors respectively.

In one embodiment, XShiftMax and YShiftMax may be 2 pixels and XShiftDelta and YShiftDelta may be 1/32 pixel. Thus, the number of comparisons for a single zoom factor in this example is: $(2 \times 2 \times 32)^2 = 128^2 = 16,384$. In one embodiment, the values in the Z direction may be as follows: Zoom_Min=0.5, Zoom_Max=2, and Zoom_Delta=0.1 giving 15 zoom factors. For the example presented, the total number of zoom, shift and correlation searches may be of the order of: 15×16,384=246 K operations. The above embodiment is one example of possible conditions, but others are equally relevant depending on the system and application.

The search algorithm described above "covers all" search options (positions and scaling of image) and may require substantial computation effort. As the finger mouse needs to operate at high frame rates (1 KHz to 10 KHz), there is only a relatively short time available to perform the necessary processing. The time scales at these frame rates are of the order of 100 µs to 1 ms. In order to reduce the computational effort, the present disclosure proposes using the previous motion vector (X, Y, and Z) as the starting point of any further search. The search then continues by progressing away from the starting point in one or each direction to conduct the search with steps of increasing accuracy. This reduces the area through which the searching progresses and identifies the motion vector with less computation effort. This may be carried out as described in the following steps.
1. X0, Y0, Z0=previous motion vector
2. Set search offsets to be DX1, DY1, DZ1; where typically DX1=X0, DY1=Y00 and DZ0=Z0
3. Produce SADscores with X0±DX1;0, Y0±DY1;0, Z0+DZ1;0. Further detail of this is shown by reference to FIG. 8, which shows each of the 27 possible SAD runs
4. Check the SAD results for each of the 27 tests and find the one which has the best correlation or the lowest SADscore. This gives an indication of the best shift to be used for the next iteration. For example, SAD run 16 produces the lowest SAD, hence X1=X0−DX1, Y1=Y1+DY1, Z1=Z0 are the best set of coordinates for starting the next pass.
5. Repeat steps 3 & 4 with the shift values halved, i.e. DX2=DX1/2, DY2=DY1/2 and DZ2=DZ1/2.

As the search is progressing in a repeating cycle, each time the best SADscore, and thus motion vector, is identified and the next repeat produces a more accurate result. Experimentation suggests five repeats of steps 3 and 4 are needed to accurately determine the motion vector. The search distance for each repeat is essentially halved. As such, the number of operations, such as zoom, correlation and shift, which occur with the present disclosure, is significantly reduced when compared with previous systems. The total number of operations to find a match in the above example is 5×27=135 operations. This compares favorably with the previous "cover all" algorithm, which may require over 245K operations.

With the typical finger mice, the user's finger is always on the surface of the module, and hence, the illumination and brightness seen by the sensor remains substantially constant. However, with the present disclosure, the distance between the user's finger and the surface of the finger mouse module varies. As a result, the amount of light from the light source in the module may vary. In addition, the amount of light received at the sensor may reduce when the distance between the module surface and the finger increases. This change in intensity of the image could degrade the above described matching algorithm and hence impair tracking. As such, the present disclosure applies a technique to compensate for any change in intensity as shown in FIG. 9.

Figure 9:
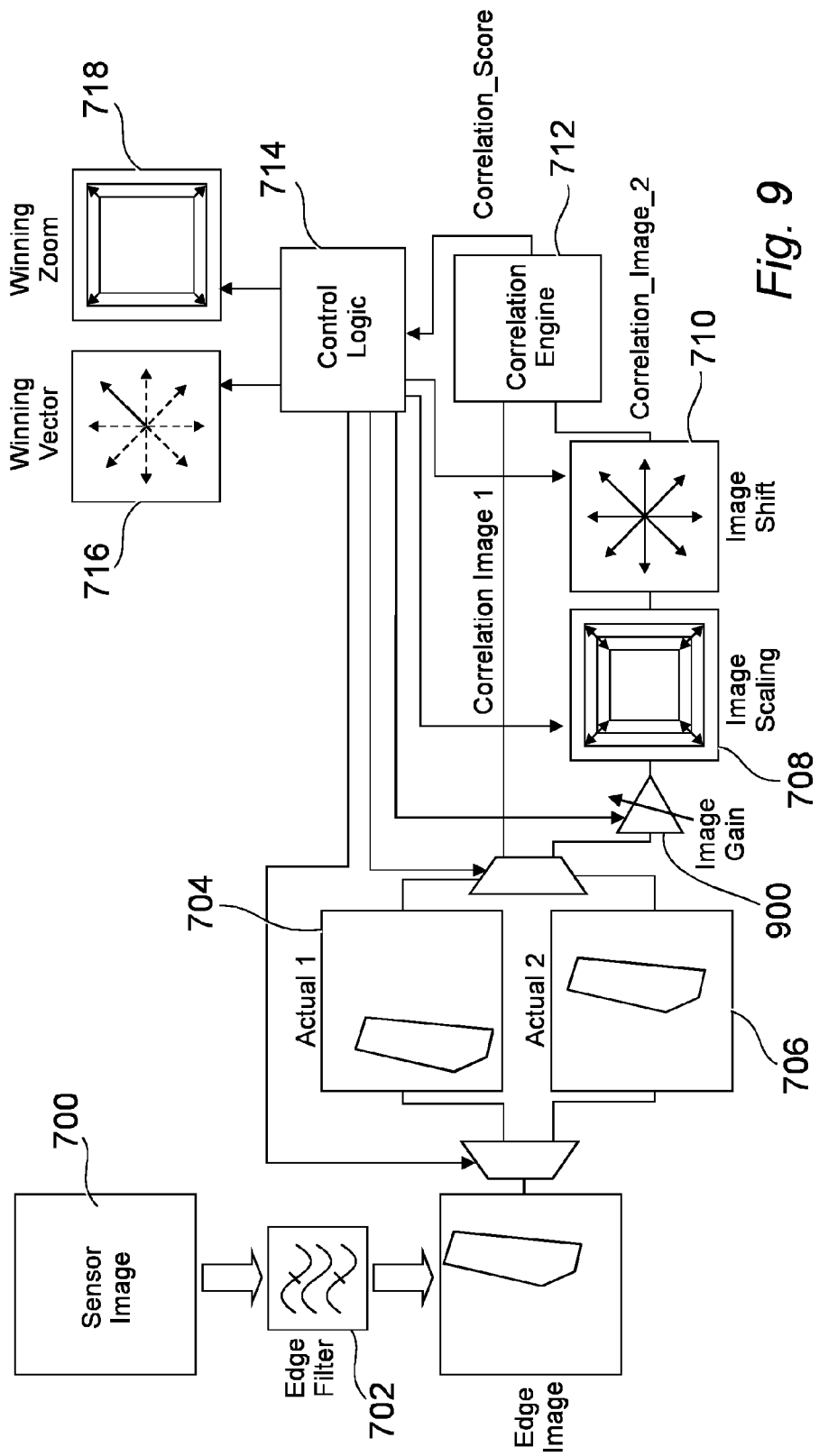
FIG. 9 is a block diagram of a 3D finger mouse image correlation function, in accordance with an embodiment of the present disclosure.

As can be seen in FIG. 9, an optical path is shown and is essentially the same as that shown in FIG. 7. As such, like elements have the same reference number and their functions are as described above. FIG. 9 further includes a gain stage 900 between the reference image 706 and the image scaling algorithm 708. As the three operations gain 900, image scaling 708 and image shift 710 are linear, it is possible to have different sequence of these operations without any impact to the overall result. The amount of image gain is pre-determined by the control logic, in conjunction with the image scaling factor. If the image scaling is <1, the image is being shrunk and thus the acquired sensor image is smaller than the reference as a result of the finger pointer being further away. As such, the acquired sensor image may be dimmer than the reference and the gain factor may be >1. Similarly, if the scaling is >1, the image is being expanded and thus the acquired sensor image is larger than the reference as a result of the finger or pointer being closer. As a result, the sensor image is brighter than the reference and the gain factor may be <1.

The amount of gain may calculated by a simple $1/r^2$ function based on basic physics where r is the distance between the illumination source and the object (e.g. finger or pointer). Alternatively, the amount of gain may include a function which accounts for the complete system performance. For example, the complete system performance may vary based the alignment of the light source with the imaging system. In this case, the illumination may vary more than standard $1/r^2$ as the object would move away from the center of the illumination and become darker as it moves away from the sensing module. This would affect performance and could be represented by an appropriate function to compensate for the effect. Other factors may also contribute to the performance and be included in a function to compensate there for as described above. Other factors may include: the beam profile of the illumination. This may be a peak at the center of the illumination beam (producing a bright image) but may be lower (and produce a darker image) away from the center of the beam. The imaging optics may have a finite depth of field and if the finger is away from the optimal focus distance, the sharpness may be reduced. Optionally, there may be a way to sharpen (e.g. increase the high spatial frequency content of) the image to reduce the defocus when the object (finger) is further away from the optimal distance.

The navigation device is intended for use in an optical navigation device; however, it may be appreciated that the navigation device could be used in any appropriate device, for example, a fingerprint reader or Lab-on-chip/Bio-Optical sensor systems (which detect chemical fluorescence for medical and/or bio-testing applications). The optical navigation device may be used in any suitable device, such as a mobile or smart telephone, other personal or communications devices, a computer, a remote controller, access modules for doors and the like, a camera or any other suitable device.

The invention claimed is:
1. An optical navigation device for detecting movement of a pointer in three dimensions, the optical navigation device comprising:
    an illumination source configured to illuminate the pointer;
    an image sensor configured to obtain a plurality of images of the pointer comprising first and second images;
    an image scaling module configured to
        scale a size of the second image using a bidirectional zooming operation with differing zoom factors;
    an image shift module configured to shift a position of the scaled second image with differing motion shifts;
    a correlation module configured to determine a plurality of difference values between the first image and a plurality of potential scaled and shifted second images, the plurality of potential scaled and shifted second images corresponding to the differing motion shifts and the differing zoom factors; and
    a control logic module configured to
        determine a motion vector between the first image and the second image by selecting a potential scaled and shifted second image with a respective difference value passing a threshold, and
        determine the movement of the pointer based upon the motion vector.
2. The optical navigation device of claim 1 wherein said image sensor comprises a single image sensor.
3. The optical navigation device of claim 1 wherein said correlation module is configured to determine the plurality of difference values based upon a sum of absolute difference (SAD) process.
4. The optical navigation device of claim 3 wherein said control logic module is configured to determine a minimum SAD value from the SAD process, the minimum SAD value indicating that the first image and the respective potential scaled and shifted second image are a match.

5. The optical navigation device of claim 1 further comprising a gain module configured to determine and compensate for a plurality of system performance variations.

6. The optical navigation device of claim 5 wherein the plurality of system performance variations includes a brightness value.

7. An optical finger mouse device for detecting movement of a pointer in three dimensions, the optical finger mouse device comprising:
an illumination source configured to illuminate the pointer;
an image sensor configured to obtain a plurality of images of the pointer comprising first and second images;
an image scaler configured to
scale a size of the second image using a bidirectional zooming operation with differing zoom factors;
an image shifter configured to shift a position of the scaled second image with differing motion shifts;
a correlator configured to determine a plurality of difference values between the first image and a plurality of potential scaled and shifted second images, the plurality of potential scaled and shifted second images corresponding to the differing motion shifts and the differing zoom factors; and
a controller configured to
determine a motion vector between the first image and the second image by selecting a potential scaled and shifted second image with a respective difference value passing a threshold, and
determine the movement of the pointer based upon the motion vector.

8. The optical finger mouse device of claim 7 wherein said correlator is configured to determine the plurality of difference values based upon a sum of absolute difference (SAD) process.

9. The optical finger mouse device of claim 8 wherein said controller is configured to determine a minimum SAD value from the SAD process, the minimum SAD value indicating that the first image and the respective potential scaled and shifted second image are a match.

10. An electronic device comprising:
a processing device; and
an optical navigation device coupled to said processing device and configured to detect movement of a pointer in three dimensions and comprising
an illumination source configured to illuminate the pointer,
an image sensor configured to obtain a plurality of images of the pointer comprising first and second images,
an image scaler configured to
scale a size of the second image using a bidirectional zooming operation with differing zoom factors,
an image shifter configured to shift a position of the scaled second image with differing motion shifts,
a correlator configured to determine a plurality of difference values between the first image and a plurality of potential scaled and shifted second images, the plurality of potential scaled and shifted second images corresponding to the differing motion shifts and the differing zoom factors, and
a controller configured to
determine a motion vector between the first image and the second image by selecting a potential scaled and shifted second image with a respective difference value passing a threshold, and
determine the movement of the pointer based upon the motion vector.

11. The electronic device of claim 10 wherein said correlator is configured to determine the plurality of difference values based upon a sum of absolute difference (SAD) process.

12. The electronic device of claim 11 wherein said controller is configured to determine a minimum SAD value from the SAD process, the minimum SAD value indicating that the first image and the respective potential scaled and shifted second image are a match.

13. The electronic device of claim 10 wherein said processing device comprises at least one of a computer, a phone, a camera, a smart phone, and a remote control.

14. A method for detecting movement of a pointer in three dimensions, the method comprising:
operating an illumination source to illuminate the pointer;
operating an image sensor to obtain a plurality of images of the pointer comprising first and second images;
operating an image scaler to
scale a size of the second image using a bidirectional zooming operation with differing zoom factors;
operating an image shifter to shift a position of the scaled second image with differing motion shifts;
operating a correlator to determine a plurality of difference values between the first image and a plurality of potential scaled and shifted second images, the plurality of potential scaled and shifted second images corresponding to the differing motion shifts and the differing zoom factors; and
operating a controller to
determine a motion vector between the first image and the second image by selecting a potential scaled and shifted second image with a respective difference value passing a threshold; and
determine the movement of the pointer based upon the motion vector.

15. The method of claim 14 wherein the image sensor comprises a single image sensor.

16. The method of claim 14 wherein determining the plurality of difference values comprises determining a sum of absolute difference (SAD) process.

17. The method of claim 16 further comprising
determining a minimum SAD value from the SAD process, the minimum SAD value indicating that the first image and the respective potential scaled and shifted second image are a match.

* * * * *